US007832791B2

(12) United States Patent
Wojcik et al.

(10) Patent No.: US 7,832,791 B2
(45) Date of Patent: Nov. 16, 2010

(54) LIFTGATE EXTERIOR MODULE FOR AN AUTOMOTIVE VEHICLE

(75) Inventors: Frank A. Wojcik, St. Clair Shores, MI (US); Costantino Ranucci, Clinton Township, MI (US); Robert J. Faubert, Shelby Township, MI (US); Richard Manning, Sterling Heights, MI (US); Kenneth J. Ladzinski, Almont, MI (US); Raja Hazime, Dearborn Heights, MI (US); William G. Yadon, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 393 days.

(21) Appl. No.: 11/749,947

(22) Filed: May 17, 2007

(65) Prior Publication Data

US 2008/0284204 A1 Nov. 20, 2008

(51) Int. Cl.
*B60J 1/18* (2006.01)
*B60J 5/10* (2006.01)

(52) U.S. Cl. .................. 296/146.8; 296/146.2; 296/56; 15/250.3; 15/250.31

(58) Field of Classification Search .................. 292/50, 292/56, 146.8, 152, 96.15–96.17; 362/503, 362/504, 501, 541, 497; 15/250.3, 250.31, 15/250.16, 250.01, 250.19
See application file for complete search history.

(56) References Cited

U.S. PATENT DOCUMENTS

| | | | |
|---|---|---|---|
| 4,845,600 A | 7/1989 | Matsumura et al. | |
| 5,621,942 A * | 4/1997 | Eustache et al. | 15/250.3 |
| 5,799,358 A * | 9/1998 | Unverrich | 15/250.01 |
| 6,123,384 A * | 9/2000 | Eustache et al. | 296/146.2 |
| 6,416,106 B2 * | 7/2002 | Ponziani | 296/56 |
| 6,637,806 B2 | 10/2003 | Kazama | |
| 6,746,072 B1 * | 6/2004 | Romesburg et al. | 296/106 |
| 6,792,643 B1 * | 9/2004 | Ponziani | 15/250.31 |
| 7,011,357 B2 * | 3/2006 | Seksaria et al. | 296/146.2 |
| 2006/0203504 A1 | 9/2006 | Mori | |

* cited by examiner

*Primary Examiner*—Patricia L Engle
*Assistant Examiner*—SunSurraye Westbrook
(74) *Attorney, Agent, or Firm*—Ralph E. Smith

(57) ABSTRACT

The technology described herein provides a molded trim assembly located externally at the top of a liftgate structure to provide an aerodynamic and stylish overhang above the liftgate glass. Furthermore, the technology also provides a liftgate exterior module including a plug-in module containing a motorized window wiper arm assembly, a central high mounted stop light, and a washer fluid spray nozzle.

16 Claims, 7 Drawing Sheets

10 30 34 32 16 12 18

10
12
14
16
18
20
22

10
32
12

30
34
16
18

12

LIFTGATE EXTERIOR MODULE FOR AN AUTOMOTIVE VEHICLE

FIELD OF THE INVENTION

The technology described herein relates generally to an automotive vehicle having a liftgate, such as a minivan, sport utility vehicle (SUV), or the like. More specifically, the technology described herein relates to a molded trim assembly located externally at the top of a liftgate structure to provide an aerodynamic and stylish overhang above the liftgate glass. Furthermore, the technology described herein relates to a liftgate exterior module including a plug-in module enclosing a motorized window wiper arm assembly, a central high mounted stop light (CHMSL), and a washer fluid spray nozzle.

BACKGROUND OF THE INVENTION

Known in the art are many vehicles provided with a variety of rear spoilers to enhance the stylish appearance of the vehicle or to provide the vehicle with aerodynamic contouring. Additionally, vehicles with rear-mounted spoilers are known in the art to integrate, a stop lamp within the spoiler trim. Furthermore, devices are known in the art that provide for wiring harness storage located within a spoiler located on a vehicle, wherein the stop lamp wiring, for example, is stored within the spoiler. None of these integrated spoilers, however, are designed to solve the particular problem addressed by this technology and none are capable of being modified to do so.

For example, U.S. Pat. No. 4,845,600, issued to Matsumara et al. on Jul. 4, 1989, discloses a vehicle spoiler lamp device, the device being mounted below the rear windshield. Additionally, U.S. Pat. No. 6,637,806, issued to Kazama on Oct. 28, 2003, discloses a rear spoiler structure for a vehicle, with the rear spoiler being a part of the rear glass plate. Finally, U.S. Patent Application Publication 2006/0203504, filed by Mori and published on Sep. 14, 2006, discloses a vehicle spoiler with a built in stop lamp, the spoiler being located below the rear windshield.

Although Matsumura et al., Kazama, and Mori each disclose various vehicle spoiler devices, none disclose the use of a molded trim assembly located externally at the top of a liftgate structure to provide an aerodynamic and stylish overhang above the liftgate glass. Furthermore, none disclose a liftgate exterior module including a plug-in module enclosing a motorized window wiper arm assembly, a central high mounted stop light (CHMSL), and a washer fluid spray nozzle. Current designs separate the functions of a motorized window wiper arm assembly, a central, high mounted stop light, and a washer fluid spray nozzle. Therefore, a need still exists for such a device as the one described herein.

BRIEF SUMMARY OF THE INVENTION

In various exemplary embodiments, the technology described herein provides a vehicle liftgate exterior module including a plug-in module enclosing a motorized window wiper arm assembly, a central high mounted stop light, and a washer fluid spray nozzle.

In one exemplary embodiment, the technology provides a liftgate exterior module. The liftgate exterior module includes: a molded trim assembly, the molded trim assembly comprising: an upwardly facing trim surface; a vehicle body facing trim surface, the vehicle body facing trim, surface comprising a motorized window wiper arm assembly receiving aperture and a washer fluid spray nozzle receiving aperture; a downwardly facing trim surface, the downwardly facing trim surface comprising a wiper arm movement aperture; and a rearwardly facing trim surface, the rearwardly facing trim surface comprising a central high mounted stop light receiving aperture. This module further includes a motorized window wiper arm assembly, the motorized window wiper arm assembly being attached to the vehicle body facing trim, surface and removably disposed within the molded trim assembly, and selectively engaged to move a wiper arm, disposed within the molded trim assembly and located above a rear windshield, in a downwardly rotating and sweeping motion across the rear windshield; and a central high mounted stop light, the central high mounted stop light being attached to the rearwardly facing trim surface and removably disposed, within the molded trim assembly. The module may further include a washer fluid spray nozzle, the washer fluid spray nozzle being removably disposed within the molded trim assembly, and being selectively activated to apply windshield washer fluid to the rear windshield from above the rear windshield and in a downwardly fan-sprayed direction.

The molded trim assembly includes a receiving aperture and concealed storage area for one or more wiring harnesses and one or more wiring leads. The molded trim assembly also includes a receiving aperture and concealed storage area for a washer fluid hose, fluidly connecting the washer fluid spray nozzle and a rear windshield washer fluid reservoir. The molded trim assembly further includes a plurality of vertical trim molding pieces, the vertical trim molding pieces being disposed generally perpendicularly about and located one at each horizontal end of the molded trim assembly. Optionally, the plurality of vertical trim, molding pieces and the molded, trim assembly are integrally formed. The plurality of vertical trim molding pieces include a receiving aperture and concealed storage area for one or more wiring harnesses and one or more wiring leads.

In another exemplary embodiment, the technology provides a liftgate exterior module. The liftgate exterior module includes: a molded trim assembly, the molded trim assembly providing a plurality of apertures for a plurality of plug-in components and wherein the plurality of plug-in components further include: a motorized window wiper arm assembly, the motorized window wiper arm assembly being removably disposed, within the molded trim assembly and selectively activated to pivotably rotate a wiper arm across a rear windshield from vertically above the windshield and moving in a downwardly rotating direction; a central high mounted stop light, the central high mounted stop light being removably disposed within the molded trim assembly; and a washer fluid spray nozzle, the washer fluid spray nozzle being removably disposed within, the molded trim assembly, and being selectively activated to apply windshield washer fluid to the rear windshield from above the rear windshield and in a downwardly fan-sprayed direction.

The liftgate exterior module further includes a plurality of vertical trim molding pieces, the vertical trim molding pieces being disposed generally perpendicularly about and located one at each horizontal end of the molded trim assembly. Optionally, the plurality of vertical trim molding pieces and the molded trim assembly are integrally formed. The plurality of vertical trim molding pieces include a receiving aperture and concealed storage area for one or more wiring harnesses and one or more wiring leads. The molded trim assembly also includes a receiving aperture and concealed storage area for one or more wiring harnesses and one or more wiring leads. The molded trim assembly further includes a receiving aperture and concealed storage area for a washer fluid hose, fluidly connecting the washer fluid spray nozzle and a rear windshield washer fluid reservoir.

In yet another exemplary embodiment, the technology provides a liftgate exterior module manufacturing method. The manufacturing method includes: utilizing a molded trim assembly, the molded trim assembly comprising: an upwardly facing trim surface; a vehicle body facing trim surface, the vehicle body facing trim surface comprising a motorized window wiper arm assembly receiving aperture and a washer fluid spray nozzle receiving aperture; a downwardly facing trim surface, the downwardly facing trim surface comprising a wiper arm movement aperture; and a rearwardly facing trim surface, the rearwardly facing trim, surface comprising a central high mounted stop light receiving aperture. The method further includes utilizing a motorized window wiper arm assembly, the motorized window wiper arm assembly attached to the vehicle body facing trim surface and removably disposed within the molded trim assembly, and selectively engaged to move a wiper arm disposed within the molded trim assembly and located above a rear windshield in a downwardly rotating and sweeping motion across the rear windshield; utilizing a washer fluid spray nozzle, the washer fluid spray nozzle removably disposed within the molded trim assembly, and being selectively activated to apply windshield washer fluid to the rear windshield from above the rear windshield and in a downwardly fan-sprayed direction; utilizing a central high mounted stop light, the central high mounted stop light attached to the rearwardly facing trim surface and removably disposed within the molded trim assembly; and assembling the motorized window wiper arm assembly, the washer fluid spray nozzle, and the central high mounted stop light within the molded trim assembly in a pluggable format into the molded trim assembly.

The method also includes utilizing a plurality of vertical trim molding pieces, the vertical trim molding pieces being disposed generally perpendicularly about and located one at each horizontal end of the molded trim assembly and assembling a first vertical trim molding piece at one horizontal end of the molded trim assembly and a second vertical trim molding piece at an opposite horizontal end of the molded trim assembly. The method also includes utilizing a receiving aperture and concealed storage area for one or more wiring harnesses and one or more wiring leads disposed with the plurality of vertical trim molding pieces and assembling the one or more wiring harnesses and the one or more wiring leads into one of the plurality of vertical trim molding pieces for electrical connectivity to the motorized window wiper arm assembly. The method also includes utilizing a receiving aperture and concealed storage area for one or more wiring harnesses and one or more wiring leads and assembling the one or more wiring harnesses and the one or more wiring leads into the molded trim assembly for electrical connectivity to the motorized window wiper arm assembly. The method also includes utilizing a receiving aperture and concealed storage area for a washer fluid hose, fluidly connecting the washer fluid spray nozzle and a rear windshield washer fluid reservoir. The assembly of the motorized window wiper arm assembly is done without drilling a hole in a rear windshield glass.

Advantageously, the liftgate exterior module eliminates the need for a drilled hole for the wiper arm in the liftgate glass. Additionally, the liftgate exterior module gains the benefit of gravity on the wiper arm of the motorized window wiper arm assembly on the downward wipe stroke. This advantageously allows for a smaller wiper motor, unavailable to current designs and low-mounted systems. Furthermore, the liftgate exterior module is easy to assemble at an automotive assembly plant due to reduced complexity and the lessened need for manpower for installation in a vehicle.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The technology is illustrated and described herein with, reference to the various drawings, in which like reference numbers denote like method steps and/or system components, respectively, and in which.

DETAILED DESCRIPTION OF THE INVENTION

Before describing the disclosed embodiments of the technology in detail it is to be understood that the technology is not limited in its application to the details of the particular arrangement shown here since the technology is capable of other embodiments. Also, the terminology used herein is for the purpose of description and not of limitation.

In various exemplary embodiments, the technology described herein provides a vehicle liftgate exterior module including a plug-in module enclosing a motorized window wiper arm assembly, a central high mounted stop light, and a washer fluid spray nozzle.

Figure 1:
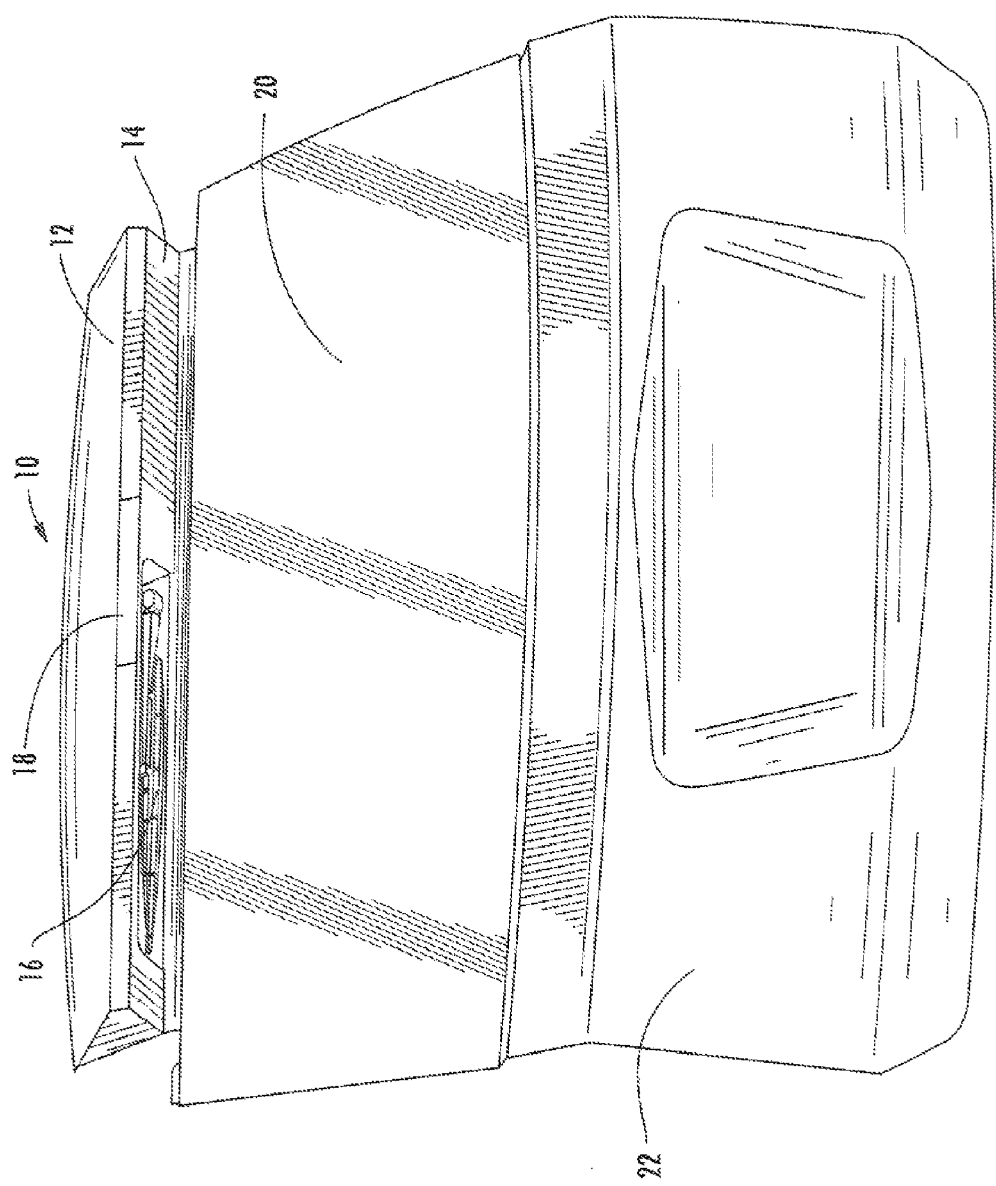
FIG. 1 is a front perspective view of a liftgate exterior module according to an embodiment of the technology, shown immediately above a rear glass windshield on a vehicle liftgate.

Referring now to FIG. 1, the liftgate exterior module 10 is illustrated in use above a rear glass windshield 20 on a vehicle liftgate 22. The liftgate exterior module 10 includes a molded trim assembly 12. The molded trim assembly 12 provides a plurality of apertures for various plug-in components. The downwardly facing trim surface 14 of the molded trim assembly is also shown. The various plug-in components include a motorized window wiper arm assembly (30 in FIG. 2), a central high mounted stop light (CHMSL) 18, and a washer fluid spray nozzle (not shown).

In various embodiments, the molded trim assembly 12 includes, for example, an upwardly facing trim surface, a vehicle body facing trim surface, a downwardly facing trim surface, and a rearwardly facing trim surface. To those in the art, it is evident that various materials and surfaces may be incorporated in forming the molded trim assembly 12. The vehicle body facing trim surface includes a motorized window wiper arm assembly receiving aperture and a washer fluid spray nozzle receiving aperture. The downwardly facing trim surface includes a wiper arm movement aperture. The rearwardly facing trim surface includes, a central high mounted stop light (CHMSL) receiving aperture.

The motorized window wiper arm assembly 30 is removably disposed within the molded trim assembly 12 and selectively activated to pivotably rotate a wiper arm 16 across a rear windshield 20 from vertically above the rear windshield 20 and moving in a downwardly rotating direction.

The central high mounted stop light (CHMSL) 18 is removably disposed within the molded trim assembly 12. The washer fluid spray nozzle is removably disposed within the molded trim assembly, and is selectively activated to apply windshield washer fluid to the rear windshield 20 from above the rear windshield 20 and in a downwardly fan-sprayed direction.

The molded trim assembly 12 further includes a receiving aperture and concealed storage area for one or more wiring harnesses and one or more wiring leads. Thus, wiring and wiring harnesses necessary for the motorized, window wiper arm assembly are stored and concealed. The molded trim assembly 12 further includes a receiving aperture and concealed storage area for a washer fluid hose, fully connecting the washer fluid spray nozzle and a rear windshield washer fluid reservoir. Thus, the washer fluid hose is stored and concealed within the molded trim assembly 12.

Figure 7:
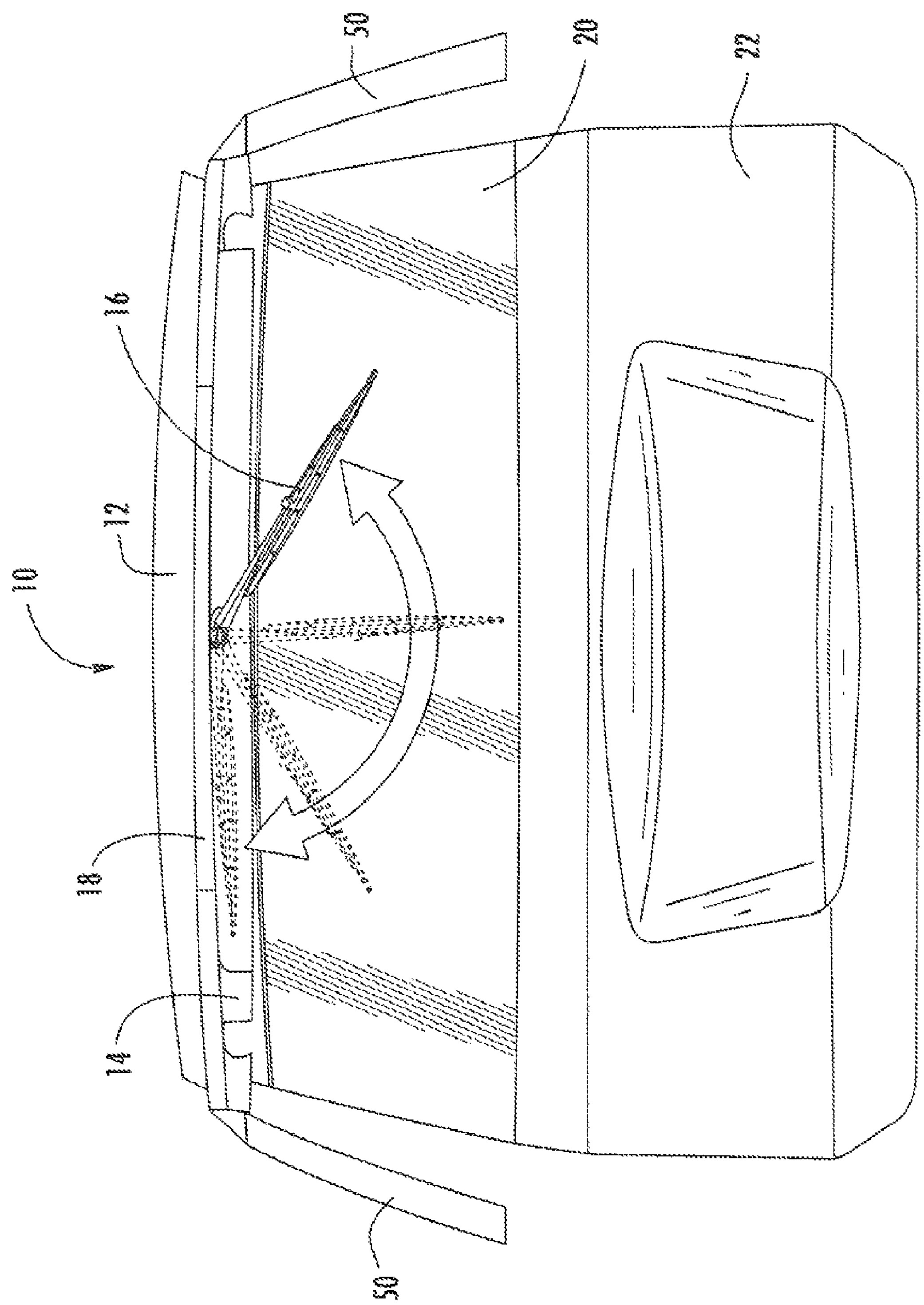
FIG. 7 is a front perspective view of a liftgate exterior module according to an embodiment of the technology, shown immediately above a rear glass windshield on a vehicle liftgate, and illustrating, in particular, molded side trim pieces and the movement of the wiper arm, extending outwardly from the molded trim assembly.

The liftgate exterior module 10 eliminates the need for a drilled hole for the wiper arm 16 in the rear windshield 20 glass. The rear windshield 20 glass arrives as a subassembly that does not require wiper arm assembly through the glass. This increases vehicle assembly speed and helps decrease manufacturing costs. The liftgate exterior module 10 gains the benefit of gravity as the wiper arm 16 of the motorized window wiper arm assembly (30 in FIG. 2) on its downward wipe stroke (as shown in FIG. 7). This placement of the wiper arm 16 allows for a smaller motorized window wiper arm assembly, which is unavailable to current designs and low-mounted systems. The liftgate exterior module 10 is easy to assemble at an automotive assembly plant due to a reduced complexity and the lessened need for manpower for installation in a vehicle. Additionally, the liftgate exterior module 10, with its spoiler-like design, creates aerodynamic and stylish accents to the vehicle.

Figure 2:
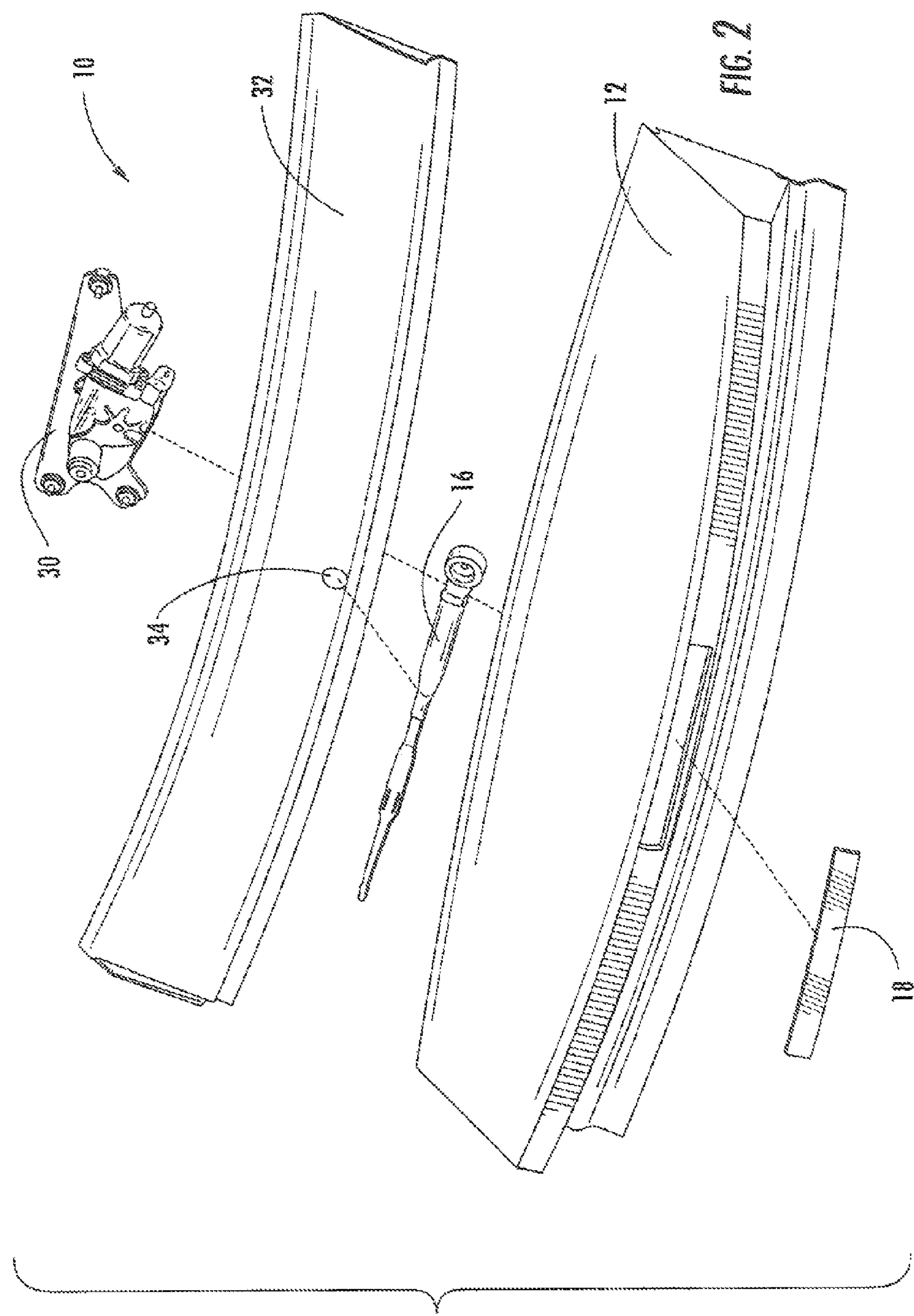
FIG. 2 is an expanded front perspective view of the liftgate exterior module of FIG. 1, illustrating, in particular, the assembly of the central high-mounted stop light, molded trim assembly, wiper arm, module interior panel, and motorized window wiper arm assembly.

Referring now to FIG. 2, an expanded, view of the liftgate exterior module 10 of FIG. 1 is shown. The liftgate exterior module 10 encloses the central high-mounted stop light 18, a motorized window wiper arm assembly 30, a wiper arm 16, and a washer fluid spray nozzle. The liftgate exterior module 10 includes a molded trim assembly 12. The molded trim, assembly 12 provides a plurality of apertures for various plug-in components.

The molded trim assembly 12 includes a module interior panel 32. The module interior panel 32 includes a motorized window wiper arm assembly receiving aperture 34. The motorized window wiper arm assembly 30 and the wiper arm 16 are located at opposite sides of the module interior panel 32 and are connected through the motorized window wiper arm assembly receiving aperture 34. The motorized window wiper arm assembly 30 is selectively engaged to move the wiper arm 16, disposed within the molded trim assembly 12 and located above a rear windshield, in a downwardly rotating and sweeping motion across the rear windshield.

The CHMSL 18 is attached to the molded trim assembly 12 and is removably disposed within the molded trim assembly upon assembly. The washer fluid spray nozzle is removably disposed within the molded trim assembly 12 and is selectively activated to apply windshield washer fluid to the rear windshield from above the rear windshield and in a downwardly fan-sprayed direction.

Figure 3:
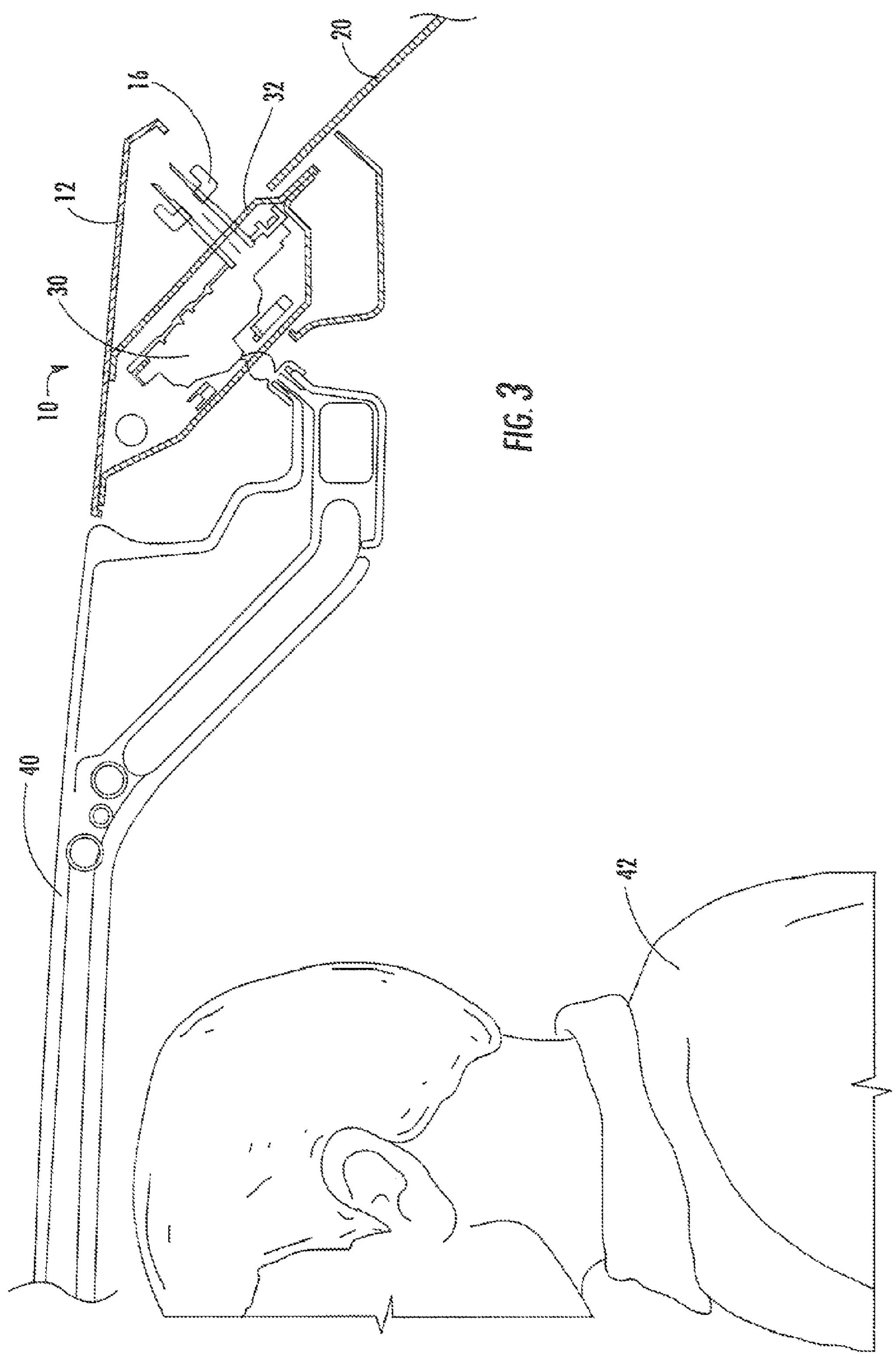
FIG. 3 is a cross-sectional side view of the liftgate exterior module of FIG. 1, illustrating, in particular, the location of the liftgate exterior module on a vehicle and in relation to the liftgate and rear windshield.

Referring now to FIG. 3, a cross-sectional side view of the liftgate exterior module 10 of FIG. 1 is shown. The liftgate exterior module 10 is installed on a vehicle body 40 above the rear windshield 20 on a vehicle liftgate. The liftgate exterior module 10 is further illustrated on the vehicle body 40 in proximal relation to a rear passenger 42. The motorized window wiper arm assembly 30 and the wiper arm 16 are located at opposite sides of the module interior panel 32 and are connected. The motorized window wiper arm assembly 30 is removably disposed within the molded trim assembly 12 and selectively activated to pivotably rotate a wiper arm 16 across a rear windshield 20 from vertically above the rear windshield 20 and moving in a downwardly rotating direction.

Figure 4:
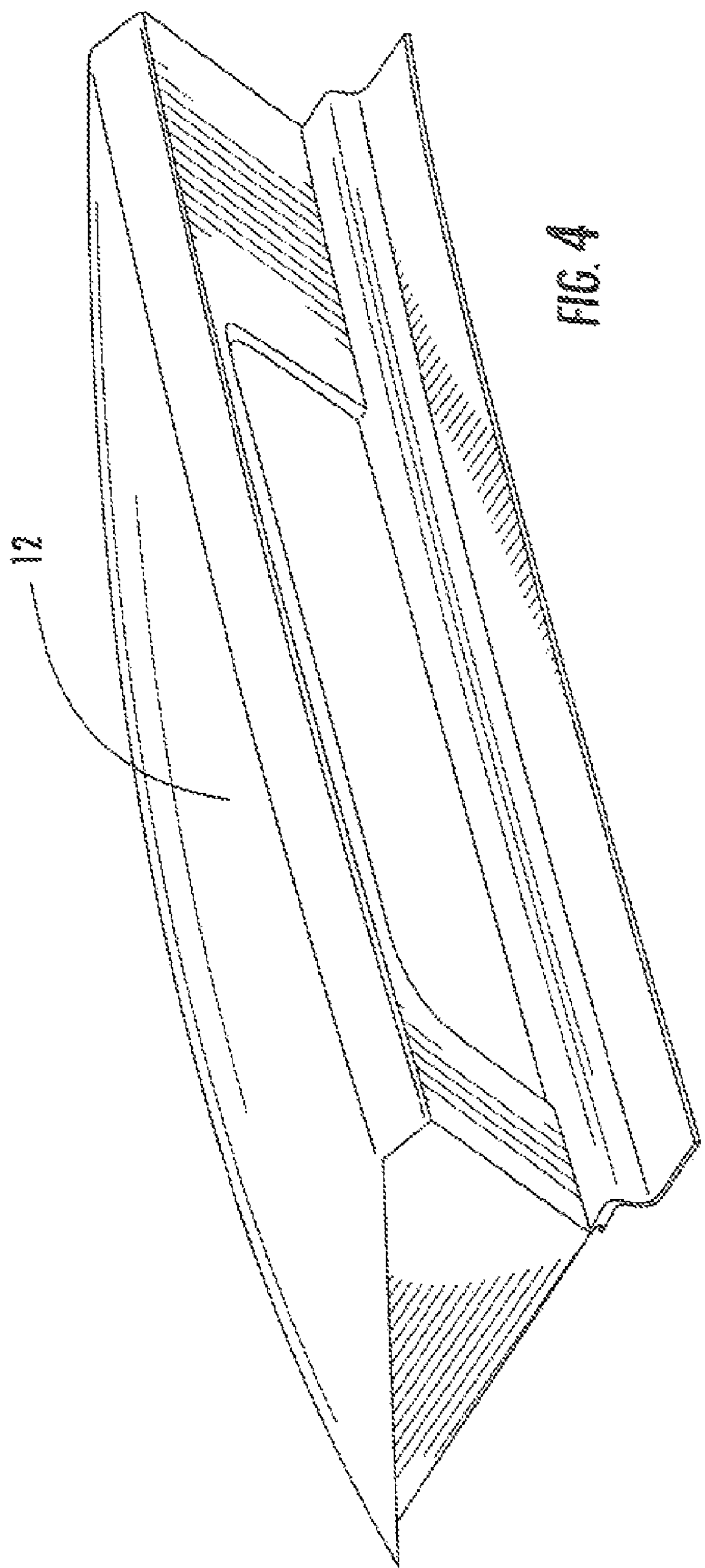
FIG. 4 is a front perspective view of the molded trim assembly of the liftgate exterior module, according to an embodiment of the technology, illustrating, in particular, an opening for the washer fluid spray nozzle and the outward extension of the wiper arm.
Figure 5:
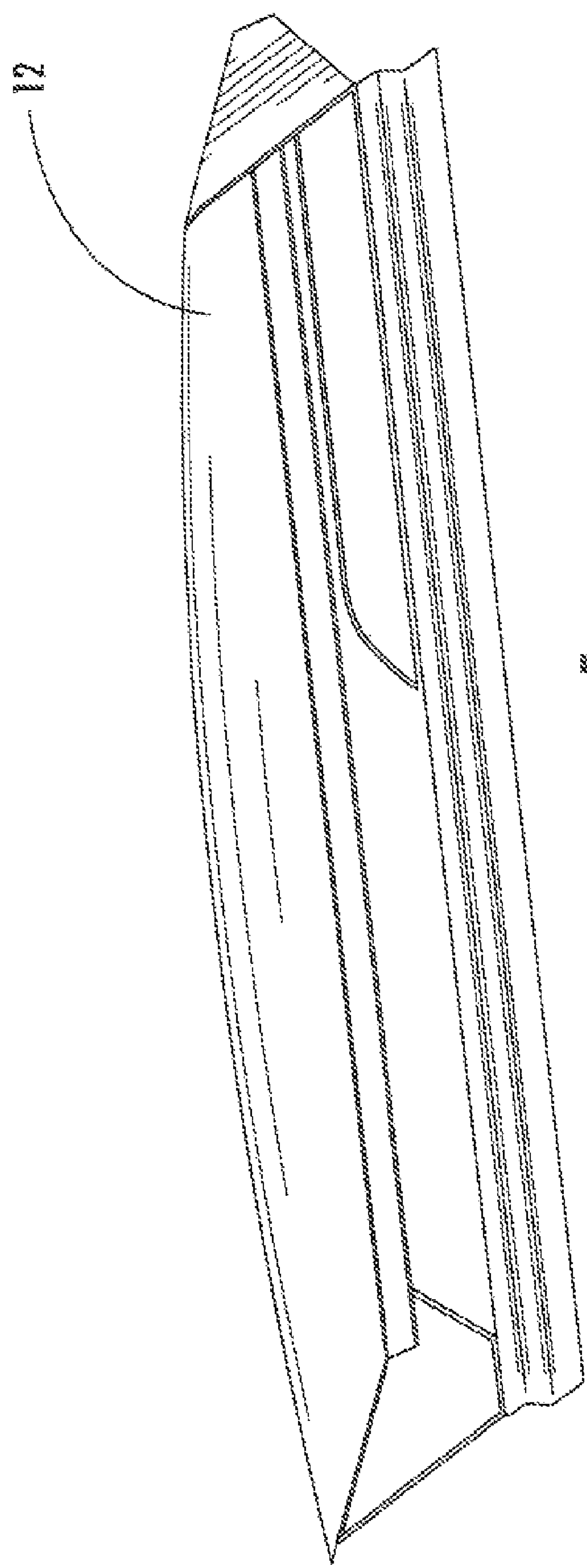
FIG. 5 is a rear perspective view of the molded trim assembly of the liftgate exterior module, illustrating, in particular, an opening for the washer fluid spray nozzle and the outward extension of the wiper arm.
Figure 6:
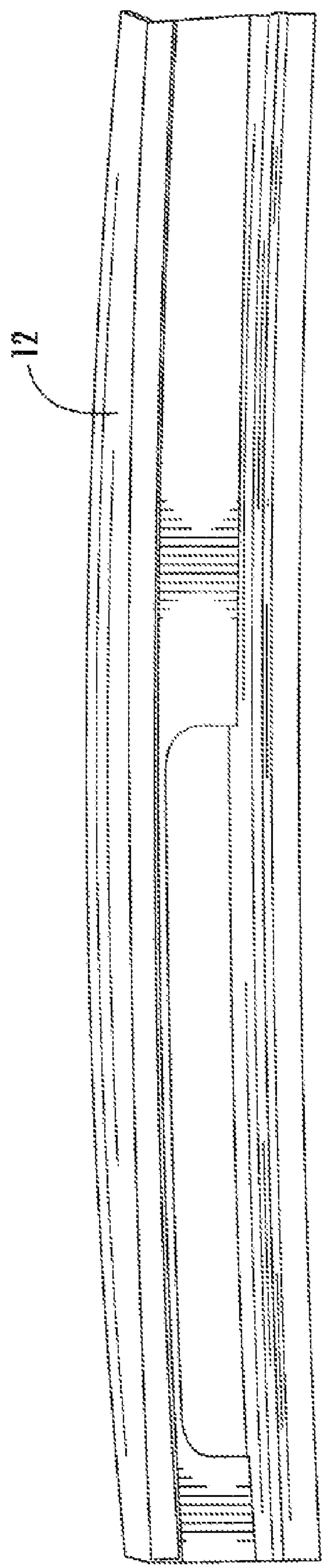
FIG. 6 is a bottom perspective view of the molded trim assembly of the liftgate exterior module, illustrating, in particular, an opening for the washer fluid spray nozzle and the outward extension of the wiper arm.

Referring now to FIGS. 4, 5, and 6, various views of the molded trim assembly 12 are shown. FIG. 4 is a front perspective view of the molded trim assembly 12 of the liftgate exterior module illustrating, in particular, an opening for the washer fluid spray nozzle and the outward extension of the wiper arm. FIG. 5 is a rear perspective view of the molded trim assembly 12. FIG. 6 is a bottom perspective view of the molded trim assembly 12 of the liftgate exterior module. It is well known to those of ordinary skill in the art that various materials and surfaces, and of varying sizes, may be incorporated in forming the molded trim, assembly 12, so long as the molded trim assembly 12 provides a plurality of apertures for various plug-in components to be used above a vehicle liftgate and rear windshield.

Referring now to FIG. 7, the liftgate exterior module 10 is illustrated in use above a rear glass windshield 20 on a vehicle liftgate 22. The liftgate exterior module 10 includes a molded trim assembly 12. The molded trim assembly 12 provides a plurality of apertures for various plug-in components. The downwardly facing trim surface 14 of the molded trim assembly 12 is also shown. The various plug-in components include a motorized window wiper arm assembly (30 in FIG. 2), a central high mounted stop light (CHMSL) 18, and a washer fluid spray nozzle (not shown). The washer fluid spray nozzle is located within the molded trim assembly 12 or is, optionally, located on the wiper arm 16 itself. The molded trim assembly 12 further includes a pair of side trim pieces 50 being disposed generally perpendicularly about, and located one at, each horizontal end of the molded trim assembly.

The motorized window wiper arm assembly 30 is removably disposed within the molded trim assembly 12 and selectively activated to pivotably rotate a wiper arm 16 across a rear windshield 20 from vertically above the rear windshield 20 and moving in a downwardly rotating direction. The wiper arm 16 is shown in movement across the rear windshield 20 and stowed within the molded trim assembly 12.

The central high mounted stop light (CHMSL) 18 is removably disposed within the molded trim assembly 12. The washer fluid spray nozzle is removably disposed within the molded trim assembly, and is selectively activated to apply windshield washer fluid to the rear windshield 20 from above the rear windshield 20 and in a downwardly fan-sprayed direction.

Although this technology has been illustrated and described herein with reference to preferred embodiments and specific examples thereof, it will, be readily apparent to those of ordinary skill in the art that other embodiments and examples can perform similar functions and/or achieve like results. All such equivalent embodiments and examples are within, the spirit and scope of the technology and are intended to be covered by the following claims.

What is claimed is:

1. A liftgate exterior module for an automotive vehicle, the module comprising:

a molded trim assembly, the molded trim assembly comprising: an upwardly facing trim surface; a vehicle body facing trim surface, the vehicle body facing trim surface comprising a motorized window wiper arm assembly receiving aperture; a downwardly facing trim surface, the downwardly facing trim surface comprising a wiper arm movement aperture; and a rearwardly facing trim surface, the rearwardly facing trim surface comprising a central high mounted stop light receiving aperture;

a motorized window wiper arm assembly, the motorized window wiper arm assembly being attached to the vehicle body facing trim surface and removably disposed within the molded trim assembly, and selectively engaged to move a wiper arm, disposed within the molded trim assembly and located above a rear windshield, in a downwardly rotating and sweeping motion across the rear windshield; and a central high mounted stop light, the central high mounted stop light being attached to the rearwardly facing trim surface and removably disposed within the molded trim assembly.

2. The liftgate exterior module of claim 1, the molded trim assembly further comprising:

a receiving aperture and concealed storage area for one or more wiring harnesses and one or more wiring leads.

3. The liftgate exterior module of claim 1, the molded trim assembly further comprising: a receiving aperture and concealed storage area for a washer fluid hose, fluidly connecting the washer fluid spray nozzle and a rear windshield washer fluid reservoir.

4. The liftgate exterior module of claim 1, molded trim assembly further comprising:

plurality of vertical trim molding pieces, the vertical trim molding pieces being disposed generally perpendicularly about and located one at each horizontal end of the molded trim assembly.

5. The liftgate exterior module of claim 4, wherein the plurality of vertical trim molding pieces and the molded trim assembly are integrally formed.

6. The liftgate exterior module of claim 4, wherein the plurality of vertical trim molding pieces further comprises: a receiving aperture and concealed storage area for one or more wiring harnesses and one or more wiring leads.

7. The liftgate exterior module of claim 1, wherein the wiper arm is contained within the wiper arm movement aperture and is spaced from the rear windshield when the wiper arm is in a stowed position thereof.

8. A liftgate exterior module, the module comprising:

a molded trim assembly, the molded trim assembly providing a plurality of apertures for a plurality of plug-in components and wherein the plurality of plug-in components further comprise:

a motorized window wiper arm assembly, the motorized window wiper arm assembly being removably disposed within the molded trim assembly and selectively activated to pivotably rotate a wiper arm across a rear windshield from a position vertically above the windshield and moving in a downwardly rotating direction; and a central high mounted stop light, the central high mounted stop light being removably disposed within the molded trim assembly.

9. The liftgate exterior module of claim 8, further comprising;

a plurality of vertical trim molding pieces, the vertical trim molding pieces being disposed generally perpendicularly about and located one at each horizontal end of the molded trim assembly.

10. The liftgate exterior module of claim 9, wherein the plurality of vertical trim molding pieces and the molded trim assembly are integrally formed.

11. The liftgate exterior module of claim 9, wherein the plurality of vertical trim molding pieces have formed therein a receiving aperture and concealed storage area for one or more wiring harnesses and one or more wiring leads.

12. The liftgate exterior module of claim 8, the molded trim assembly having formed therein a receiving aperture and a concealed storage area for one or more wiring harnesses and one or more wiring leads.

13. The liftgate exterior module of claim 12, wherein the molded trim assembly has formed therein a concealed storage area for receiving a washer fluid hose fluidly connecting a washer fluid spray nozzle and a rear windshield washer fluid reservoir.

14. The liftgate exterior module of claim 8, wherein the wiper arm is contained in one of the apertures in the molded trim assembly and is spaced from the rear windshield when the wiper arm is in a stowed position thereof.

15. A rear spoiler for a vehicle having a rear window, comprising:

a molded trim assembly adapted to be mounted to the vehicle generally above a top edge of the rear window and having an upwardly facing trim piece, a vehicle body facing trim piece, a downwardly facing trim piece, and a rearwardly facing trim piece;

a first opening formed in the rearwardly facing trim piece and adapted to receive a central high mounted stop light; and a second opening formed in the downwardly facing trim piece and operative to provide a recess into which a wiper arm, when not in use, is stowed in a relationship in which the entire wiper arm is located above the rear window.

16. The rear spoiler of claim 15, further comprising a third opening formed in the vehicle body facing trim piece and adapted to receive a wiper arm coupler for coupling the wiper arm to a wiper arm motor assembly.

* * * * *